May 22, 1951          H. D. KIRBY          2,553,656
CAMERA BOX STRUCTURE
Filed Oct. 29, 1945          9 Sheets-Sheet 1
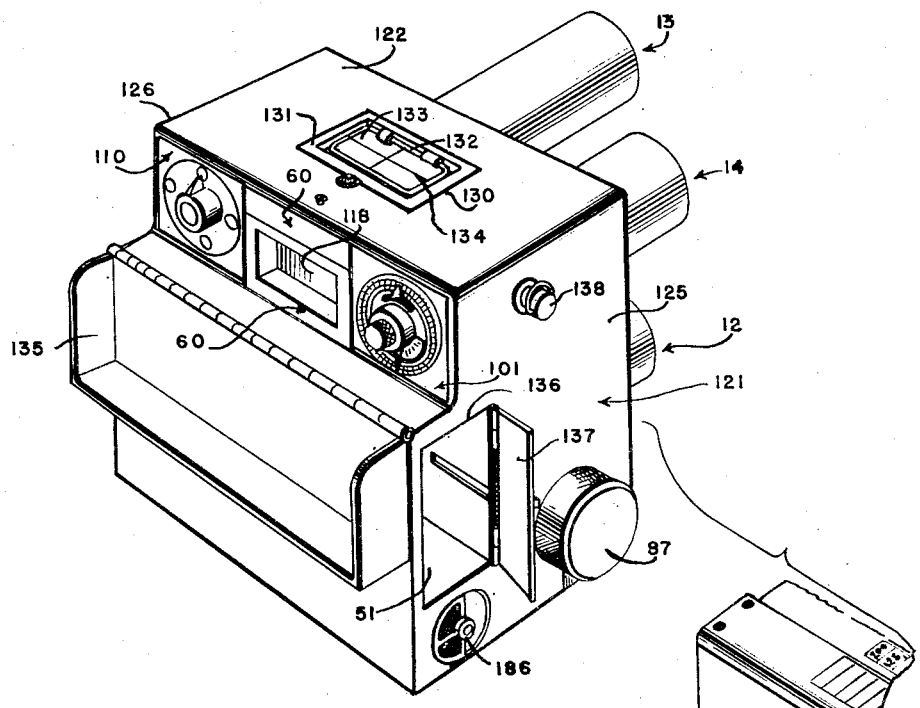
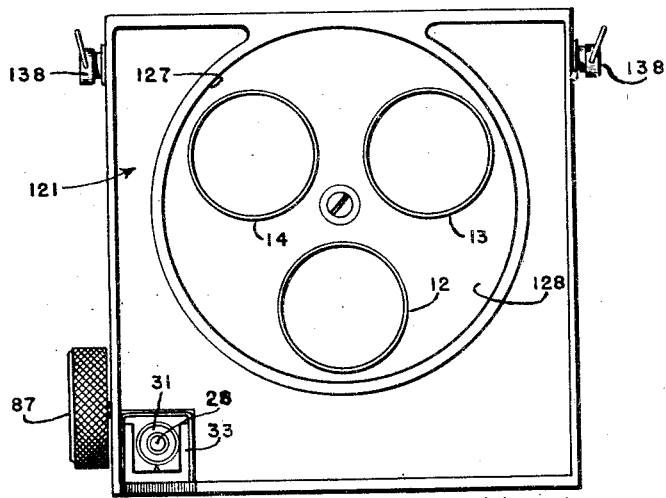
INVENTOR
HERBERT D. KIRBY
BY Semmes Keegin Beale & Semmes
ATTORNEYS

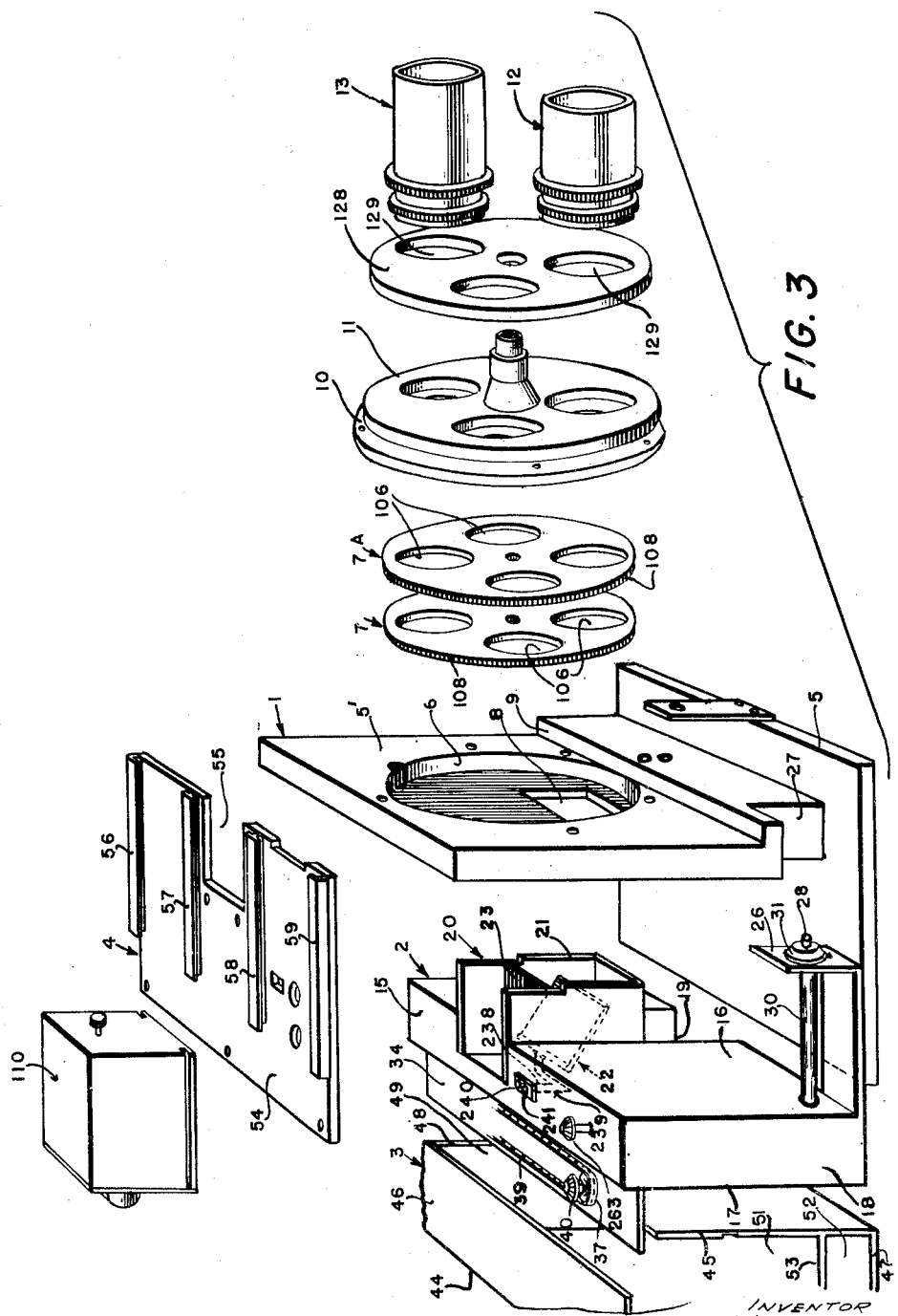

INVENTOR
HERBERT D. KIRBY
ATTORNEYS

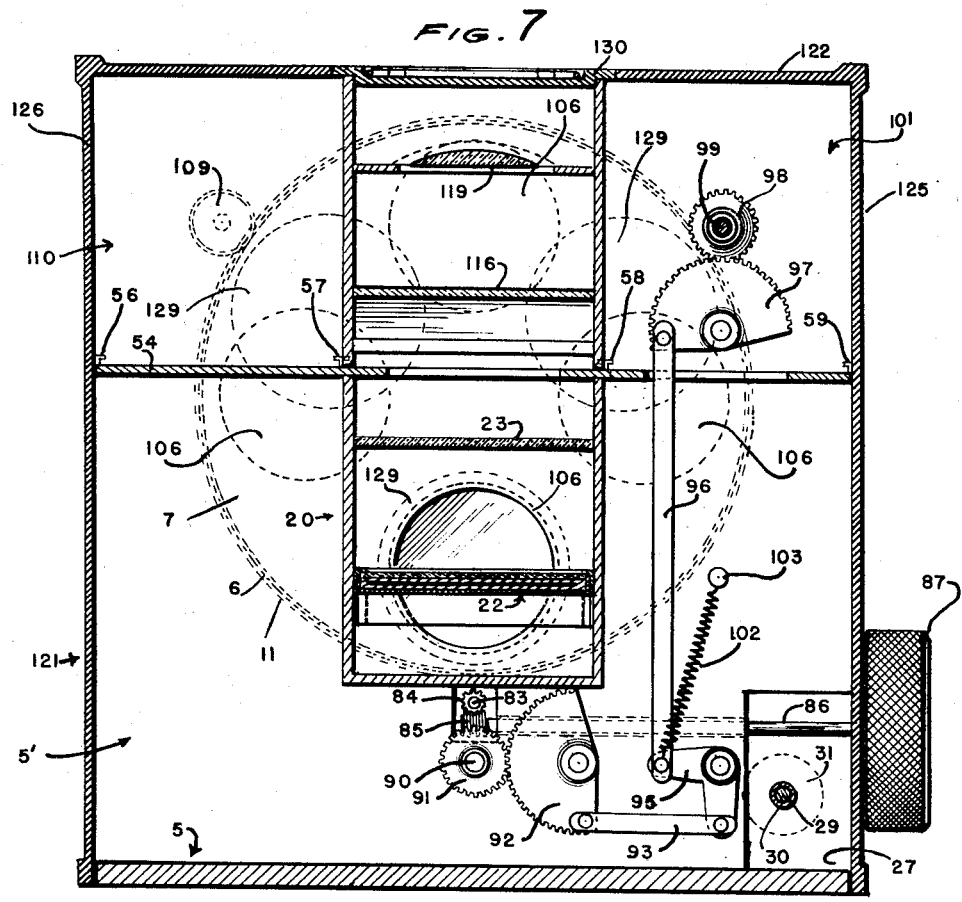

May 22, 1951      H. D. KIRBY      2,553,656
CAMERA BOX STRUCTURE

Filed Oct. 29, 1945      9 Sheets-Sheet 5

INVENTOR
HERBERT D. KIRBY
BY Semmes Keegin Beale & Semmes
ATTORNEYS

May 22, 1951 H. D. KIRBY 2,553,656
CAMERA BOX STRUCTURE
Filed Oct. 29, 1945 9 Sheets-Sheet 6
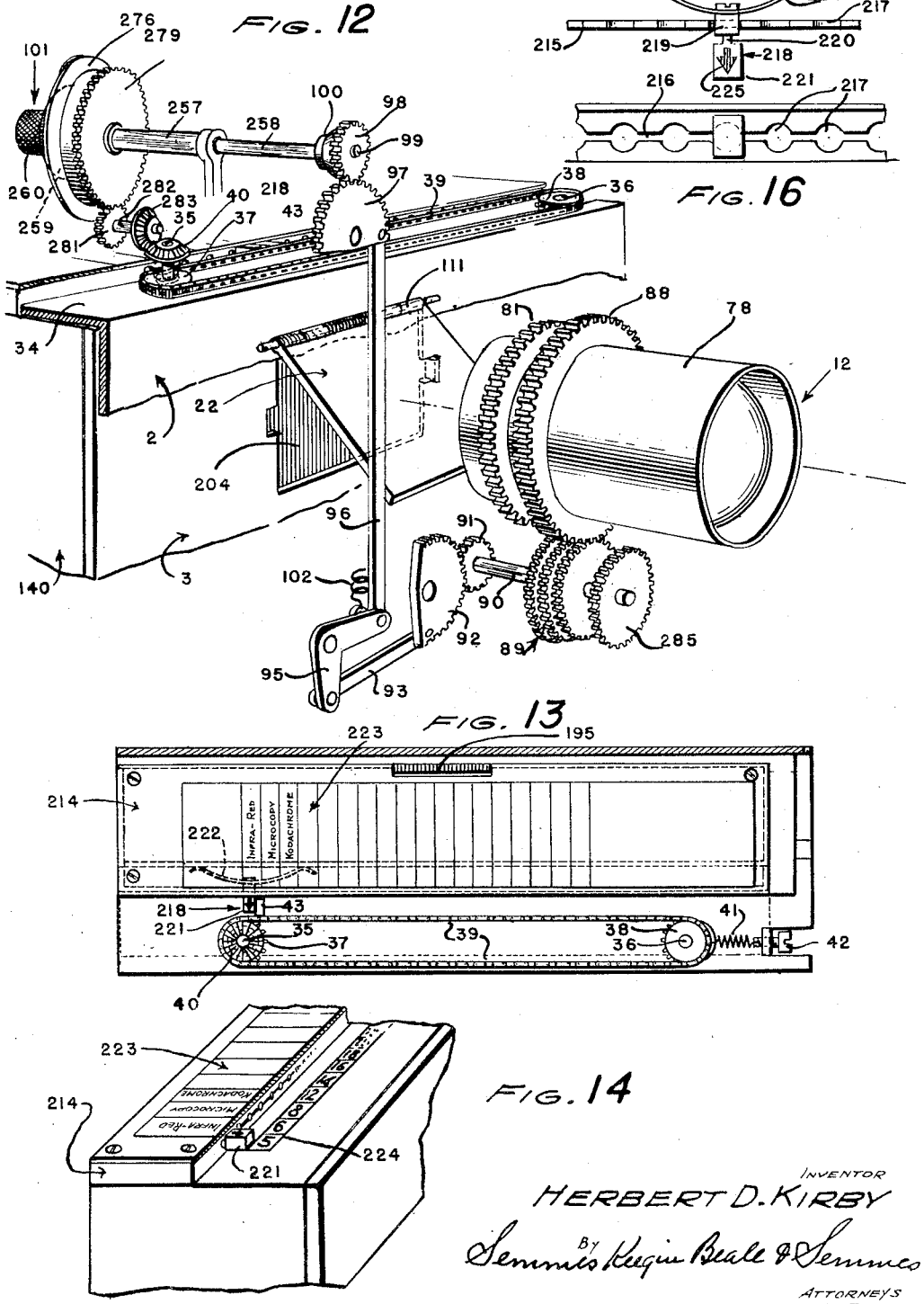
INVENTOR
HERBERT D. KIRBY
BY Semmes Keegin Beale & Semmes
ATTORNEYS

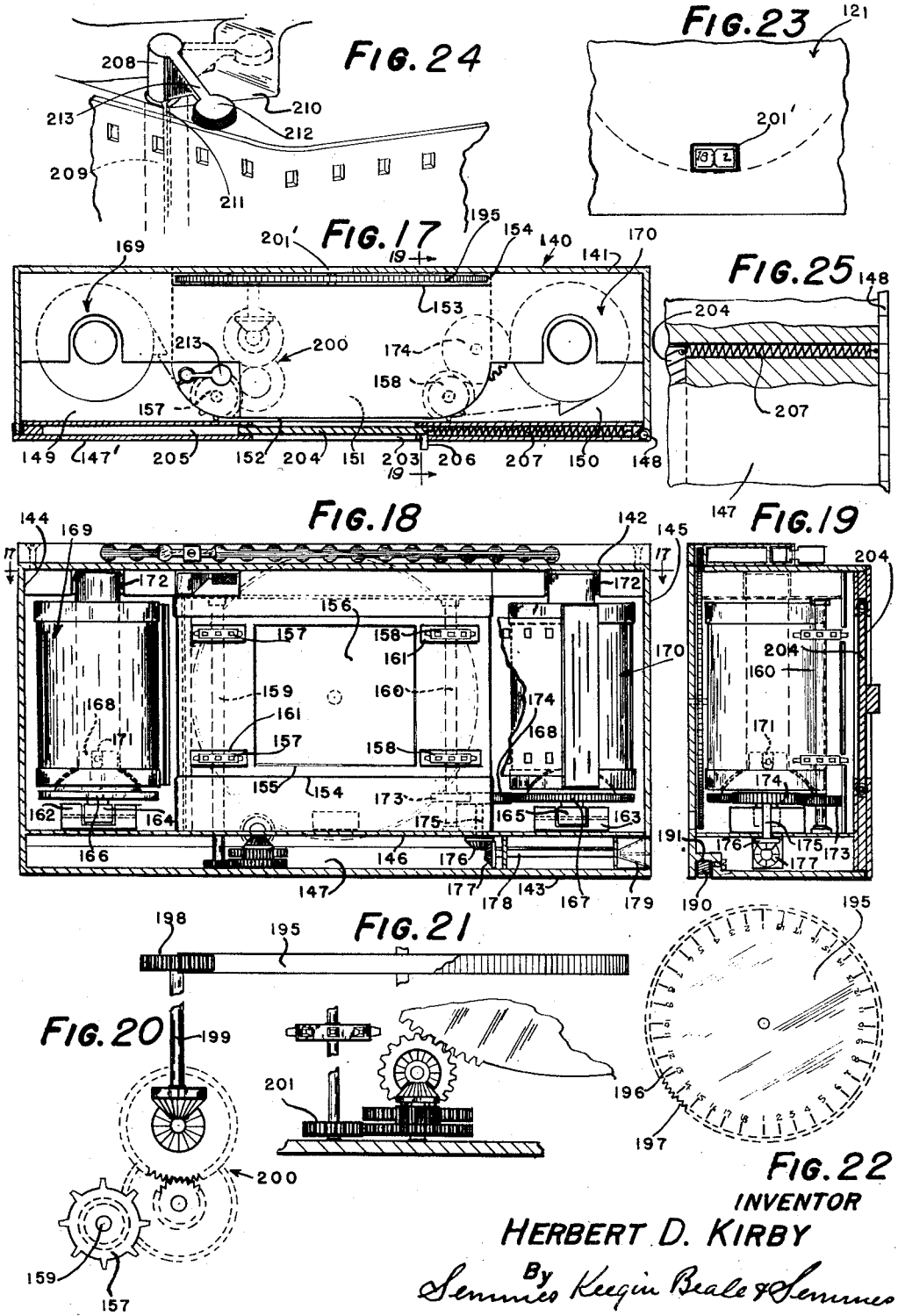

May 22, 1951 H. D. KIRBY 2,553,656
CAMERA BOX STRUCTURE
Filed Oct. 29, 1945 9 Sheets-Sheet 8
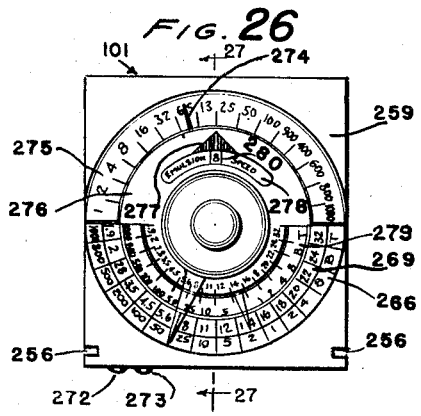
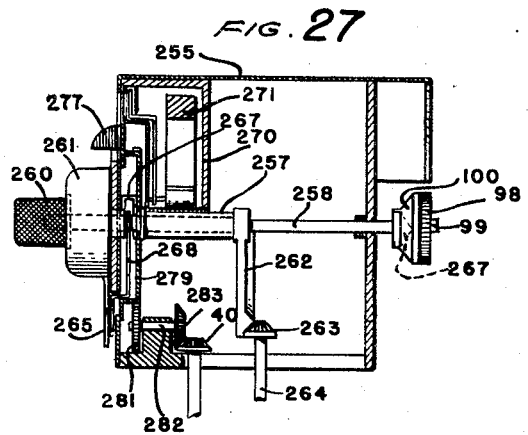
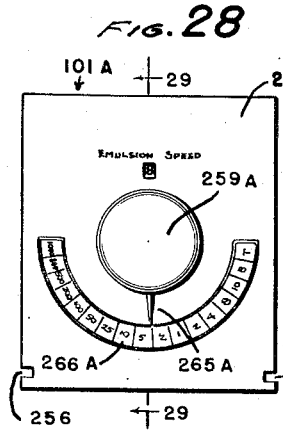
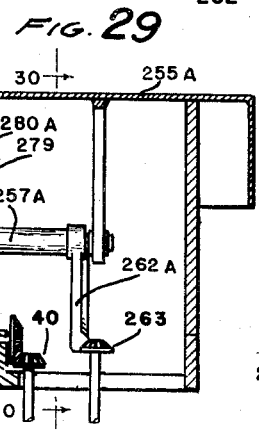
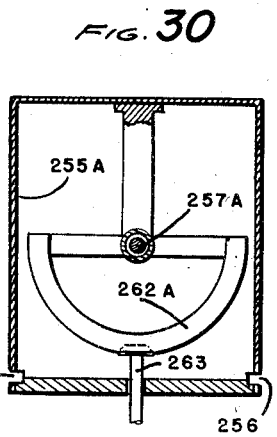
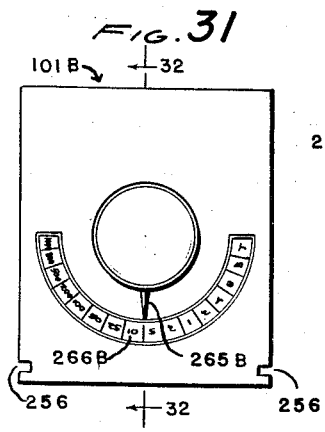
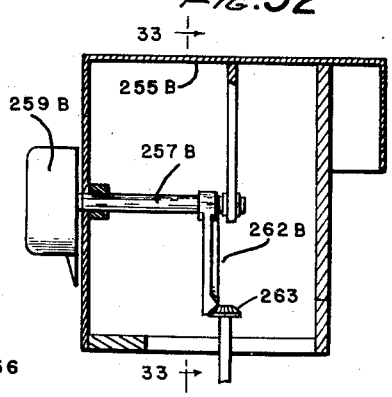
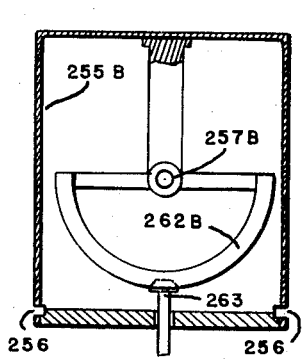
INVENTOR
HERBERT D. KIRBY
ATTORNEYS May 22, 1951  H. D. KIRBY  2,553,656
CAMERA BOX STRUCTURE
Filed Oct. 29, 1945  9 Sheets-Sheet 9
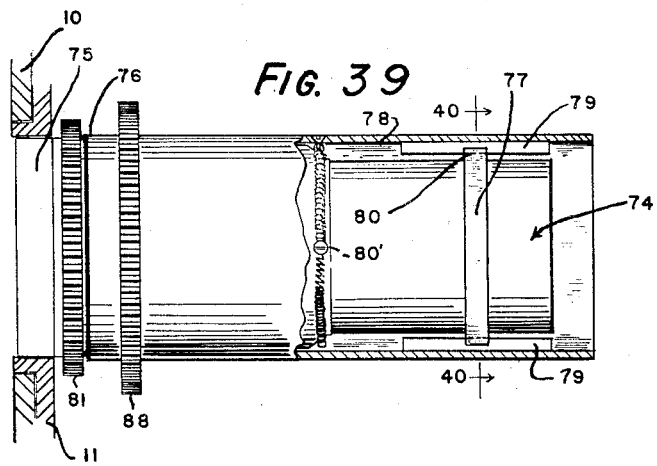
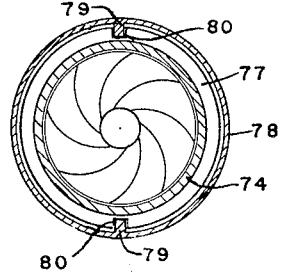
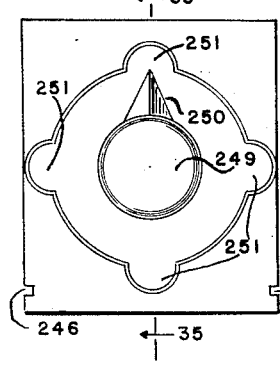
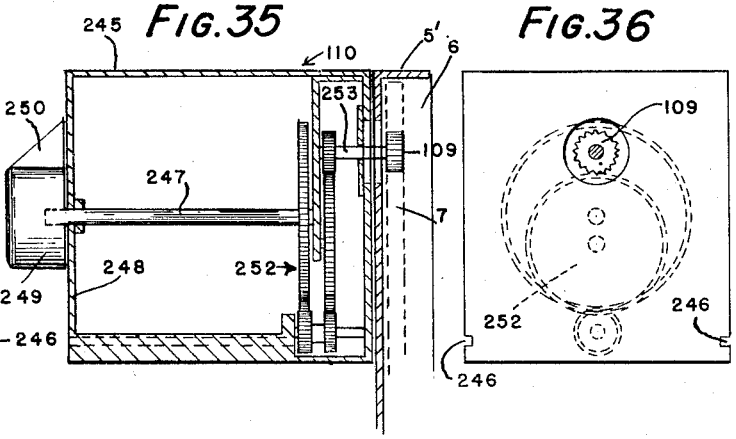
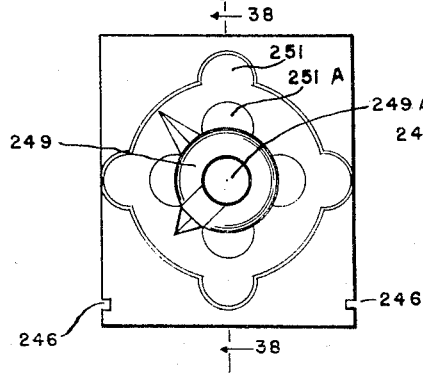
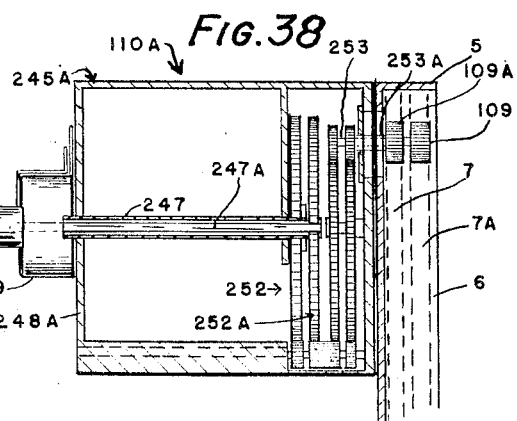
INVENTOR
HERBERT D. KIRBY
By Semmes Keegin Beale & Semmes
ATTORNEYS Patented May 22, 1951

2,553,656

UNITED STATES PATENT OFFICE 2,553,656

CAMERA BOX STRUCTURE

Herbert D. Kirby, Hayden Lake, Idaho, assignor to Progressive-Assembly Cameras, Inc., New York, N. Y., a corporation of New York Application October 29, 1945, Serial No. 625,144

9 Claims. (Cl. 95—11)

This invention relates to cameras and more particularly to camera construction which lends itself to precision mass production and provides a compact basic camera design which with the assembly and interchange of novel and unique composite control units or parts, produces a multiplicity of camera types or models for the accomplishment of varied photographic requirements and purposes. By means of the invention, new and novel photographic innovations or improvements can be constantly adapted or incorporated into new composite component units, or parts, thus allowing the camera unit to be continually kept up to date in photographic techniques without requiring a change in the basic camera unit. Such component units are interchangeable composite devices becoming an integral part of the camera unit and are not to be confused with camera accessories, as such.

Heretofore, photographic beginners were prone to start with simple camera designs usually the fixed-focus box-type or simple bellows-focusing cameras, and then as their technique, skill and desire for greater proficiency developed, graduated to more expensive precision types, abandoning or disposing of their simpler cameras in search of more ideal and ultimate photographic techniques and effects. In the growing field of amateur and professional photographers, there exists a definite demand for new and radical camera designs incorporating the photographic advantages of simplicity and accuracy of operation, precision mechanisms, and instantaneous availability of interchangeable lenses, filters, and film types.

It is therefore the purpose of this invention to provide a compact picture taking device or camera of "fluid" design which will provide within one case or camera body, such novel and unique interchangeable composite devices, units or parts as will enable the user, with a choice of lenses and filters mounted in the camera, in turret arrangement, and by means of novel instantaneous and semi-automatic exposure computing and setting devices within the camera, to take well defined and accurately exposed rapid-sequence photographs on film of various types carried in film magazines insertable in the camera. Thus, the camera according to this invention has such flexibility of design that from one basic camera frame unit a multiplicity of types and models can be evolved by the assembly and reassembly of varied units and parts, thereby providing progressive camera models suitable for the beginning amateur, the advanced amateur and the discriminating professional photographer without abandoning the basic camera design.

A more specific object of the invention is to provide a compact picture-taking device or camera of the above type which incorporates a basic frame unit constructed of sectional precision parts and so designed that interchangeable composite component parts or devices can be affixed to the frame unit in precision mounts to form varied types or models of photographic taking devices without abandonment of the basic camera design.

A further object of the invention is to provide a compact picture-taking device or camera of single-lens reflex type which provides a means for taking rapid-sequence photographs, automatically transporting film in a removable film magazine, resetting the reflex reflector unit, and winding the focal plane shutter after each exposure.

A still further object of the invention is to provide a camera of the above type comprising a basic camera unit to which may be added various composite component control units or parts and onto which can be affixed suitable lens systems and filters in turret arrangements for the accurate exposing of various types of film positioned in interchangeable film magazines.

Yet another object of the invention is to provide a camera which is provided with means, including interchangeable film magazines of a novel design and operation, whereby exposures of the same scene, at substantially the same time, may be made on film of similar or different character, either black and white or color, and at various film speeds.

A still further object of the invention is to provide a camera of the above type which is provided with an interchangeable cover unit which may be constructed of light-metal or plastic or other suitable material and which is so designed that it is interchangeable on all of the above-mentioned basic frame units to form a complete protective covering for the basic unit and the selected component parts mounted thereon, and which is provided with adequate apertures, doors, recesses, etc. to provide access to control units, indicating devices and other component parts of the camera.

Other objects and advantages of the invention will become apparent during the course of the following description with the understanding that various changes may be made in the design, construction, and arrangement of parts forming the combinations, by those skilled in the art without departing from the spirit of the invention or exceeding the scope of the appended claims.

In order to make the invention more clearly understood, preferred forms thereof are illustrated in the accompanying drawings in which:

Figure 1 is a rear view in perspective of the camera embodying this invention.

Figure 2 is a front elevational view of the camera.

Figure 3 is an exploded view in perspective of a sectional basic frame unit and lens system.

Figure 7 is a vertical sectional view taken along the line 7—7 of Figure 4.

Figure 8 is a transverse sectional view of the reflex reflector and light cell unit.

Figure 9 is an exploded view in perspective of the parts comprising the unit shown in Figure 8.

Figure 12 is a diagrammatic view in perspective illustrating the mechanism and parts comprising the optical system of the camera.

Figure 13 is a plan view of a standard form of film magazine and parts of film emulsion speed compensating device associated therewith.

Figure 14 is a perspective view illustrating film speed presetting device on the magazine.

Figure 15 is a fragmental view in plan of the film speed setting device showing in detail the actuating block.

Figure 16 is a front elevational view of the parts shown in Figure 15.

Figure 17 is a sectional view of the standard film magazine taken on the line 17—17 of Figure 18.

Figure 18 is a sectional view of the magazine taken on the line 18—18 of Figure 17.

Figure 19 is a sectional view of the magazine taken on the line 19—19 of Figure 17.

Figure 20 is a diagrammatic view in plan of a gear train for actuating the exposure counting mechanism.

Figure 21 is a fragmental elevational view further illustrating exposure counter actuating gear train.

Figure 22 is a face view of the exposure indicator disc.

Figure 23 is a fragmental elevational view of the film magazine illustrating the exposure indicator opening therein.

Figure 24 is a fragmental perspective view illustrating parts of a film cut-off knife built into the magazine.

Figure 25 is a fragmental view partly in section illustrating the arrangement of springs for tensioning the film magazine door to closed position.

Figure 26 is a front elevational view illustrating a "master" exposure control unit.

Figure 27 is a sectional view taken on the line 27—27 of Figure 26.

Figure 28 is a front elevational view illustrating an "advanced" exposure control unit.

Figure 29 is a sectional view taken on the line 29—29 of Figure 28.

Figure 30 is a sectional view taken on the line 30—30 of Figure 29.

Figure 31 is a front elevational view illustrating a "basic" exposure control unit.

Figure 32 is a sectional view taken on the line 32—32 of Figure 31.

Figure 33 is a sectional view taken on the line 33—33 of Figure 32.

Figure 34 is a front elevational view of a single ring filter selector control unit.

Figure 35 is a sectional view taken on the line 35—35 of Figure 34.

Figure 36 is a rear elevational view of a single filter selector control unit.

Figure 37 is a front elevational view illustrating a double ring filter selector control unit.

Figure 38 is a sectional view taken on the line 38—38 of Figure 37.

Figure 39 is a side elevational view partly in transverse section, of one of the lens barrels.

Figure 40 is a sectional view taken on the line 40—40 of Figure 39.

Figures 4, 5, 6:
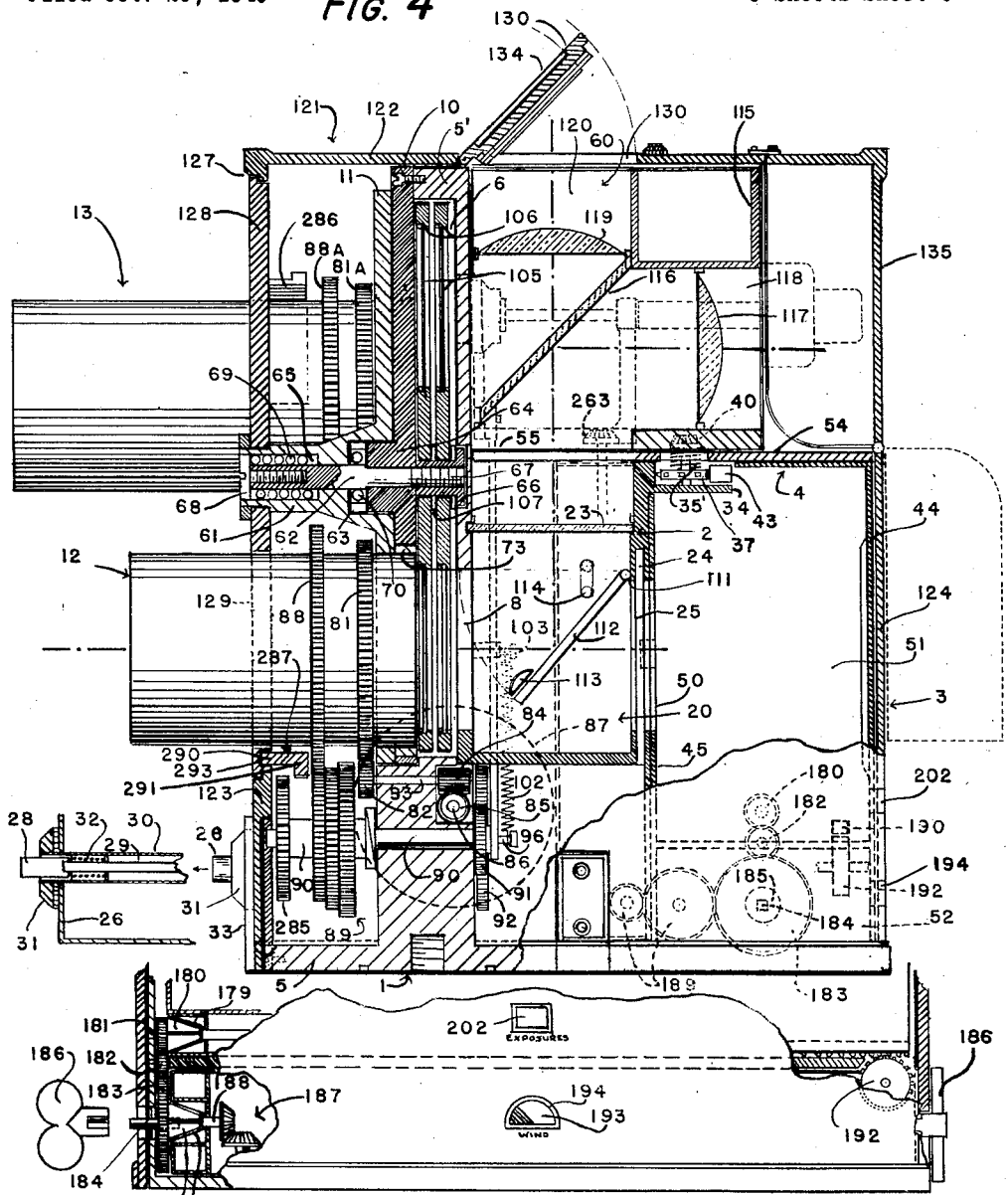
Figure 4 is a transverse sectional view taken substantially along the optical axis of the camera, parts of the camera, however, being shown in side elevation.
Figure 5 is a fragmental rear elevational view partly broken away.
Figure 6 is a perspective view showing one of the connecting gear assemblies.

Established photographic principles dictate the observance of definite technique for the accomplishment of satisfactory and desirable photographic effects. Foremost among the possible errors of picture-taking are improper focusing and improper exposure. To these factors of error are added disadvantages of restriction to one type of film at a time, wrong type lens on camera for best photographic effect, manual transport of film, manual winding of shutter, consideration of various filter factors, and numerous and scattered mechanical manipulations and exposure settings. Basically, the ultimate desired in picture-taking is the release from mechanical manipulation and mental computation, with emphasis on the artistic or pictorial aspects of individual composition, with correct exposure factors combined into as nearly an automatic function as is consistent with photographic engineering technique. To provide a simplified and flexible camera device which will afford a remedial approach to the numerous existing disadvantages in present-day camera equipment, requires the observance of the combination, and the control, of the photographic factors inter-related between the optical system of the camera, type of film used, shutter speeds available, focusing device provided, and the light-value of the image accepted by the lens projecting on the film plane. Because these inter-related factors directly effect the desired photographic conception, the premise is established hereby that the control of these factors is consequently inter-related, and for the greatest effectiveness and efficiency of photographic technique, these factors should be arranged and combined in a unitary structure which provides as nearly automatic computation and control as consistent with good photographic design and engineering practice, but yet possessing flexibility of design for the greatest application to varied photographic techniques. To accomplish this combination and function, this invention provides a compact and simplified camera in which suitable optical, and mechanical linkage systems have been provided to accurately compute and semi-automatically control all photographic factors pertinent to effective photographic results.

Among the novel and unique composite component control units, devices, and parts provided by this invention, to accomplish the centralization, computation, and control of accurate composition, focusing, and exposure, in a unitary structure supported by a basic frame or chassis, are: A universal focusing device comprising a suitable focusing knob located in convenient natural position on the camera for accurately focusing on ground-glass, within the camera body, the image accepted by any selected lens on the lens turret, through any selected filter in the filter system, and through a dual-reflex viewer unit. The image accepted by any lens, which has been specially adapted for this function, is impinged on a swinging semi-transparent reflex-reflector unit located in the lens-to-film axis in a manner well understood in the reflex camera art, the semi-transparent mirror face of which reflects the image upward onto a ground-glass, which in turn projects the image through the dual-reflex viewing unit mounted on the top of the basic camera frame. Here, by means of another semi-transparent mirror the image may be viewed both from above and to the rear of the camera.

The reflex-reflector unit is constructed to permit the light accepted by any selected lens to pass through an interchangeable semi-transparent mirror face and register on interchangeable, plastic sealed photo-electric cell units mounted in the reflector frame directly behind the semi-transparent mirror face. The impulse created by the image light registering on the photo-electric cell is carried upward by conductors to a composite exposure control unit mounted on top of the basic frame, where a compensated photo-electric cell activated unit registers or indicates the value of the accepted light on a suitable exposure computing scale. A novel film emulsion-speed compensating device, mounted on a removable film magazine, further contributes to the combination of exposure factors by automatically adjusting or compensating the exposure computing scale of the exposure control for the proper emulsion-speed of the film being exposed each time the film magazine is entered in the camera body. Equalization of an exposure-computing dial with the photo-electric light-value indicator needle will instantly provide complete selections of accurate exposure ratios for the scene or object being photographed.

The choice of shutter-speed, and lens-diaphragm opening is remotely selected by the simple manipulation of centralized nested control knobs on the exposure control unit, actuating a precision control linkage system connecting the exposure control unit with the lens system, and the control unit with the shutter mechanism. The provision of actuating units to automatically transport the film strip to the next frame, wind the focal-plane shutter after each exposure, and reset the reflex-reflector unit may be likewise incorporated in the camera to permit the taking of rapid sequence photographs.

A suitable focal-plane shutter and control mechanism, which may be of a type well known to this art, is provided within the basic frame, the operation of which is controlled directly by varied models of composite exposure control units mounted on the basic frame unit, thus providing suitable interchangeable control devices for the varying technique and requirements of the beginning amateur and the professional photographer. A selection of proper light filters is accomplished by the provision of interchangeable composite filter selector units, mounted in precision mounts on the basic frame, which will remotely select any filter (or combination of filters) mounted in built-in filter turrets.

In addition to the above, the camera provides interchangeable film magazines which can be instantly inserted or removed from the camera body as desired. Conventional light-tight film spools can be loaded into these magazines, one or more exposures taken, and the magazine removed from the camera body and replaced instantly with another loaded magazine holding a different type of film. Also, if desired, one or more exposures can be taken, the magazine removed from the camera body, the exposed portion of the film severed from the remainder and removed from the magazine for processing. Another feature of the magazine is an aperture door, which opens automatically when the film magazine is inserted into the light-tight camera body, allowing such film to be exposed as desired, and closing automatically as the magazine is withdrawn from the camera body. Still another feature is a gear-rack affixed to the base of the film magazine which meshes with a gear forming a portion of the winding mechanism of a spring motor actuating unit, causing the spring motor to be wound automatically each time the film magazine is inserted into the camera body.

Enclosing the basic frame unit and the parts carried thereby, with the exception of the projecting portions of the lens barrels and focusing knob, is a slip-on cover unit attached to the frame. This cover may be made of suitable material such as light metal or plastic in various surface finishes. It is provided with suitable apertures and doors for access to the various manipulating and viewing devices of the camera, and may be provided with means for securing suitable straps or slings for supporting the camera.

The camera is preferably of a generally rectangular shape and of a size to be conveniently carried and used by the photographer. The embodiments illustrated are designed for use with 35 mm., perforated film but it is obvious that by change in size and arrangement of certain parts, and by the substitution of certain parts by others which are well known, it may be adapted to other sizes and types of film without departing from the principles underlying the invention.

Basic frame unit

This unit, best shown in Figures 3 and 4 of the drawings, constitutes one of the important features of the invention and its construction permits the assembly and reassembly of a multiplicity of picture-taking devices or camera types and models for varied photographic techniques and purposes. Essentially, the frame unit or camera chassis comprises a front section 1, an intermediate section 2, a rear section 3 and a top section or plate 4. Those sections are preferably precisely machined for accurate interfitting relationship with each other and with other similarly designated sections which may be substituted for them and which may incorporate or support more or less advanced picture-taking mechanisms and devices. Suitable means are provided for rigidly securing the several sections together.

The front section 1 comprises a base 5 having a front wall 5' perpendicular thereto and preferably integrally formed therewith. The front face of the front wall 5' is provided with a substantially centrally located, circular recess 6 for the reception of one or more rotatable light filter supporting rings, or discs which are designated generally as 7 and 7a. The wall 5', adjacent the lower portion of the recess 6 is apertured to provide a rectangular image aperture 8. Substantially tangentially to the lower arc of the recess 6, the front wall 5' is stepped rearwardly to provide a shelf 9 for locating, and bringing flush with the lower front face of the wall, a circular support plate 10 which is removably secured to the front wall 5' to cover the recess 6. The plate 10 serves as a support for a lens turret, indicated generally as 11, which is rotatably mounted on the plate 10 and is adapted to mount a plurality of lenses (three in the illustrated camera) generally designated 12, 13 and 14. The front wall 5' likewise journals and supports mechanism, to be described later, to perform operations of lens and filter selection, focusing and regulation of lens apertures.

The intermediate or center section 2 of the frame is of box-like construction adapted to rest on the base 5 of the front section 1 spaced rearwardly somewhat from the front wall 5' thereof. It has a top wall 15, front wall 16, rear wall 17 and end walls 18. Intermediate the end walls 18 and fitted in a recess 19, is a rectangular image tunnel 20 which extends from the rear wall 17 and projects forwardly from the front wall 16. This tunnel is open at its top and the forward edge is somewhat offset as shown at 21 to fit within the aperture 8 in the front section. The tunnel 20 in addition to forming a passage for light from lens to film also serves to support a swingable reflex-reflector unit 22 and a ground-glass plate 23 upon which the image transmitted by the lens and reflected by the reflex unit may be viewed prior to making an exposure. This structure forms a part of the optical system of the camera and will be described in more detail later in connection therewith.

The center section 2 is adapted to carry a focal plane shutter and its winding, setting and releasing mechanism. This is not shown but may be of conventional design consisting of one or more apertured curtains carried on rollers which may be journalled at opposite ends of the center section, the curtain or curtains passing through a slot 24 provided therefor in the rear wall 17 (see Figure 4). The rear wall 17 is apertured to provide an image window 25, aligned with the aperture 8, to permit passage of light from the lens to the film plane.

A right angle bracket 26 is formed integrally with or attached to the center section 2 and extends forwardly from the lower wall thereof adjacent an end wall 18. This bracket is of a length so that when the center section is in place with respect to the front section 1, the right angle portion lies substantially flush with the front face of the front section 1 fitting within a cutaway 27 in the front wall 5' thereof. This bracket is adapted to support the exposed portion of the shutter release mechanism comprising essentially a release button 28 at one end of a rod 29 which passes through a tube 30 from the center section 2. The release button may incorporate a delayed action mechanism which is indicated by a setting dial 31, surrounding the button 28, and a spring motor arrangement indicated diagrammatically by the spring 32. This mechanism functions in the usual manner to delay release of the shutter for a predetermined time interval. The bracket 26 may also be provided with a suitable attaching slide 33 adjacent the button for the attachment thereto of a cable release or intervalometer for making sequence exposures. This attaching slide 33 is shown in Figure 2.

Adjacent the top wall 15 of the center section, and projecting rearwardly from the rear wall 17, is a shelf 34 which extends from one to the opposite end walls 18. This shelf supports, adjacent opposite ends thereof, a pair of vertical stub shafts 35 and 36 which carry respectively sprocket wheels 37 and 38 about which pass an endless sprocket chain 39 (see Figures 12 and 13). The shaft 35 likewise carries a bevel gear 40 while the opposite shaft 36 is preferably arranged for slight movement toward and away from the shaft 35 and is provided with suitable means, such as indicated by the spring 41 and adjusting screw 42, for tightening the chain 39. The chain 39 is provided with a laterally projecting lug 43. Provided to urge the chain 39 in a direction to move the lug 43 toward the left as seen in Figure 13, are resilient means such as a spiral spring 35' engaging the shaft 35. This mechanism forms a part of a film speed emulsion compensating arrangement, the function and operation of which will be set forth later.

The rear section 3, adapted to abut the center section 2 and also rest on the base 5 of the front section, is likewise of box-like construction having a rear wall 44, a front wall 45, top wall 46, bottom wall 47 and a single end wall 48, the opposite end being open. The upper end of the front wall 45 is spaced slightly below the top wall 46 to provide a space 49 therebetween to permit passage of the shelf 34 and its supported mechanism into the rear section. The front wall 45 is also apertured to form an image window 50 adapted to register with the window 25 in the center section 2. Dividing the rear section into superposed upper and lower rectangular compartments 51 and 52, each extending the width of the rear section, is a partition wall 53 parallel with the bottom wall 47. The compartments 51 and 52 are respectively for the reception of a film magazine and film transport actuating mechanism, both of which will be described.

The top section 4, which is adapted to extend from the rear face of the vertical portion 5' of the front section 1 to the rear face of the rear section 3, rests on the top walls of the center and rear sections. This is essentially a flat plate 54 with a rectangular cut-out 55 in its front portion adapted to register with the open top of the image tunnel 20. This plate carries on its upper surface a series of four parallel tracks or rails designated respectively as 56, 57, 58 and 59. Preferably these rails extend rearwardly from the front edge of the plate parallel with the optical axis of the camera. The two intermediate rails 57 and 58 are of T-section and lie adjacent opposite side edges of the cut-out 55 while the rails 56 and 59 are of inverted L-section and lie adjacent opposite edges of the plate with their flanges directed inwardly. These rails serve, as will be seen later, as means for detachably securing to the top section a reflex image viewing unit and certain component control units employed for performing the camera functions.

*The optical system*

The optical system of the camera includes the lenses 12, 13 and 14 mounted in turret arrangement on the front section 1 of the frame for selective positioning before the film, light modifying filters likewise mounted in turret arrangement for selective positioning between lens and film, mechanism for adjusting lens focus and aperture and filter selection by remote control from actuating units, and a viewing and framing arrangement which includes the reflex mirror 22, ground glass 23 and a dual viewing unit 60.

Preferably, to adequately meet usual picture taking demands, three lenses of different types or focal length are provided in the unitary structure of the present camera: one a normal lens of proper focal length for the picture size, for example 50 mm. for 35 mm. frames; a telephoto lens; and a wide angle lens. It is understood, however, that other lens arrangements and a greater or lesser number of lenses (within the capacity of the turret) may be used, depending upon the desires of the individual photographer.

As best seen in Figure 4, the lens turret 11 is provided with a forwardly extending central hub 61 provided with an axial bore 62. The bore 62 is countersunk from the rear face of the turret to provide a socket 63 adapted to receive a circular boss 64 formed on the front face of the support plate 10. The forward end of the hub bore 62 is likewise counterbored to provide a pocket 65. Secured to the plate 10, concentrically with the boss 64, by means of a flanged nut 66 is a shouldered stud 67 which extends through the bore 62 to adjacent the forward end of the pocket. The forward end of this stud is fitted with a headed screw 68, between the head of which and the inner end of the pocket 65 is positioned a compression spring 69 urging the turret in the direction of the support plate 10. Preferably, a suitable overriding or one-way clutch device, such as indicated generally at 70, is provided between the stationary stud 67 and the turret to restrict the rotation of the latter to a single direcion.

Figure 11:
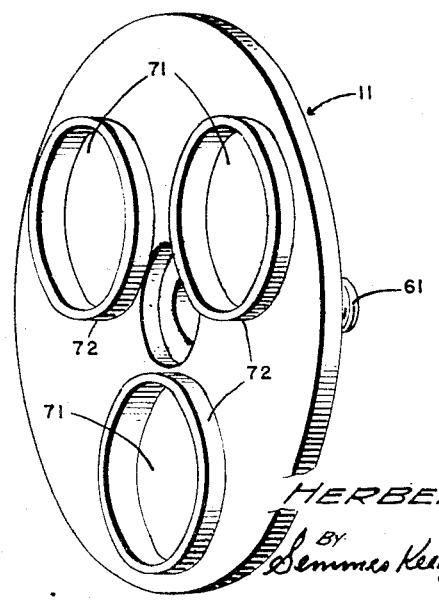
Figure 11 is a perspective view of the lens turret.

The turret 11 is provided with a series of circular apertures 71 for the reception of the camera lenses. The apertures 71 are arranged concentrically with the hub 61 and on a radius which will register them with the window 8 when the turret is rotated. On the rear face of the turret 11, each aperture 71 is formed with a rearwardly projecting annular flange or lip 72 (see Figure 11), adapted to closely fit within a corresponding aperture 73 in the support plate 10. The lower of these apertures 73 is axially aligned with the window 8. As will be seen from Figure 4, the lens turret may be pulled outwardly, against the compression of the spring 69, sufficiently to move the lips 72 out of their respective apertures 73 and permit the turret to be rotated and selectively position the lenses in registration with the window 8 or the optical axis of the camera. When in such position, the lips 72 engaging the aperture 73 will of course prevent accidental rotation of the turret and accurately align the lens being used in the optical axis of the camera.

The lenses, as best seen in Figure 39, are preferably of the type mounted in a helical focusing mount or barrel 74 comprising a stationary portion 75, which is screw threaded or otherwise suitably secured into the turret aperture 71, a relatively rotatable focusing ring 76 and an iris diaphragm regulating ring 77. In accordance with this invention, the lens mount is surrounded by a cylindrical tube 78, rotatable with respect to the mount and secured to the stationary portion thereof against relative axial movement. This tube is provided with one or more longitudinally extending, internal keys or splines 79 adapted to engage slots or keyways 80 formed in the diaphragm regulating ring 77 so that when the tube is rotated, a corresponding rotation of the ring 77 is effected to adjust the aperture of the iris diaphragm. In order that the iris shall normally be adjusted to a maximum aperture position, a resilient spring element, such as shown generally at 80', connects the tube 78 and the lens mount to urge the tube in a direction to open the aperture of the diaphragm.

Secured to the focusing ring 76 is a ring gear 81 adapted to mesh with a pinion 82 on one end of a shaft 83 journalled in the upright portion 5' of the front section 1 vertically below the center of the aperture or window 8. The opposite end of the shaft 83 carries a worm gear 84 which is meshed with a worm 85 on one end of a transverse shaft 86 which projects from the side of the camera (see Figure 7) and which is provided with a focusing knob 87. It will be understood that as either of the lenses 12, 13 or 14 are moved to picture-taking position, the focusing ring gear 81 of the respective lenses will be meshed with the pinion 82.

In order to remotely set the diaphragm aperture of the lenses, the respective tubes 78 of the lenses 12, 13 and 14 are each provided with a ring gear 88 adapted to mesh respectively, when the lens is moved to picture-taking position, with one of a nest of pinions 89 carried adjacent one end of a shaft 90 journalled in the upright wall 5' and extending through this wall immediately below the shaft 83. It will be appreciated that the ratio of the ring gears 88 of the several lenses and their mating pinions 89 are selected with reference to the particular lens to correctly move the iris diaphragm between extreme aperture positions thereof. For example, the normal lens which may have a maximum aperture of f 1.9 and a minimum aperture of f 22 may require a different gear ration than a telephoto lens having a maximum aperture of f 5.6.

As best seen in Figure 12, the opposite end of the shaft 90 has affixed thereto a small pinion 91 which meshes with a gear segment 92 pivotally connected, eccentrically with the pivot pin of the segment, one end of a link 93, the opposite end of which has an operative connection with one arm of a bell crank 95. The other arm of the bell crank is connected through a link 96 with a gear segment 97 pinned for rotary movement on the rear face of the wall 5' above the top plate 4. This latter gear segment is adapted to mesh with and be driven by a pinion 98 rotatably mounted on a stud 99 and provided with a clutch element 100. The clutch element 100 is adapted to engage a corresponding clutch element on the diaphragm setting knob shaft of a composite exposure control unit 101 to be described in detail later, and be actuated thereby to set the diaphragm aperture of the lens through medium of the linkage and gearing just described.

A suitable resilient element, such as a spring 102 connected between the bell crank 95 and a post 103 secured to the wall 5', is preferably provided to normally urge the linkage and gearing above described to a relative position corresponding to a minimum aperture position of the iris diaphragm.

Light modifying filters in accordance with this invention are built into the camera construction as a part of the optical system. These may be made from glass, gelatine or plastic discs 105 and are inserted in apertures 106 in concentric arrangement about the center hub of one or more filter mounting plates or discs 7—7A to lie behind the lens turret for selective registration with the lens which is in picture-taking position in the optical axis of the camera. One of the apertures 106 of each disc 7 and 7A will of course contain no filter.

As best seen in Figure 4, the filter discs 7 and/or 7A are mounted for rotation about the axis of the turret stud 67 and lie within the circular depression 6 formed in the wall 5'. Conveniently they may be mounted on the flanged nut 66 and be held against axial displacement by the flanged head of this nut. If desired, antifriction washers 107 may be interposed between adjacent parts of this assembly.

The peripheries of the filter discs 7 and 7A are provided with gear teeth 108 which are adapted to mesh with a pinion or pinions 109 (depending upon whether one or more filter discs are employed) which form a part of a remote filter selecting unit 110 attached to the top plate 4 by means of the rails 56 and 57. This unit 110 will likewise be described later in more detail.

Reference is again made to Figure 4 to illustrate the reflex viewing arrangement which constitutes a third component of the optical system of a camera and which aids, by viewing either from the top of the camera or from the rear of the camera, framing or focusing the subject to be photographed. Mounted by means of a suitable hinge 111 to the rear wall of the image tunnel 20 is a first surface mirror 112. This mirror 112 constitutes one embodiment of the reflex unit which has been heretofore generally designated as 22. This mirror normally occupies a position at an angle of 45° to the optical axis of the lens being used and in the path of light being transmitted by the lens, and is adapted to be swung to a horizontal position out of the path of light being transmitted by the lens to the film plane of the camera. The mirror 112 is normally held in its 45° position by a latch member 113 actuated in the usual manner by the shutter release button 28 and when the mirror is swung to its horizontal position it is adapted to actuate a shutter release pin 114 also in a manner well known in reflex camera design.

Between the mirror 112 and the open upper end of the light tunnel 20 is a ground glass pane 23 which is adapted to receive the image projected by the lens onto the mirror 112 and reflected upwardly thereby.

The image projected on the ground glass 23 is adapted to be viewed through the dual viewing unit 60. This unit comprises a substantially rectangular, box-like frame 115 detachably secured to the top plate 4 of the camera frame by means of the center rails 57 and 58 which engage grooves provided therefor on opposite sides of the frame. The frame 115 encloses a 45° semi-transparent mirror 116 or an equivalent prism, positioned in the path of light reflected from the mirror 112 and is adapted to reflect light rearwardly through an enlarging lens 117 positioned in a horizontal tube 118 opening on the rear face of the frame 115, and also through a similar enlarging lens 119 positioned in a vertical tube 120 opening on the top side of the frame 115. Both the viewing tunnels or wells 118 and 120 are preferably rectangular in shape, have blackened interior surfaces, and have the lenses 117 and 119 set sufficiently back in the tunnels to reduce reflection of extraneous light from the lens surfaces.

*Cover unit*

The camera frame and its contained mechanism is enclosed by a cover unit, designated generally as 121, and which comprises a top wall 122, front wall 123, rear wall 124 and side walls 125 and 126. The bottom of the cover unit is open and is adapted to be secured to the edges of the bottom plate 5 of the front section 1. The front wall 123 is provided with a circular cutout 127 (see Figure 2) which is closed by means of a circular plate 128 attached to the hub 61 of the lens turret by suitable means, such as shown in Figure 4, for rotation with the lens turret. This circular plate is provided with a series of apertures 129 through which the lens tubes 78 may project.

The top 122 of the cover is provided with a central rectangular aperture 130 which is fitted with a hinged frame 131 carrying a suitable subject framing device 132. This framing device may incorporate, if desired, an optical viewer 133 or a simple wire framing element 134, or both. The frame is normally nested in the aperture 130 flush with the upper surface of the cover unit and is adapted to be raised at an angle of 90° to the upper surface of the cover, by any convenient means such as a torsion spring, and used as an eye level viewer.

The upper portion of the rear wall 124, a portion of the top wall 122 and the side walls 125 and 126 are cut back and provided with a hinged door member 135 for access, when the door is swung downwardly in the position shown in Figure 1, to the viewing unit 60, the filter selecting unit 110 and exposure control unit 101. The side wall 125 of the cover is provided with an aperture 136 for access to the film magazine compartment 51. This aperture 136 is normally closed by a spring closed, light tight door 137. Suitable swivel rings 138 may be provided on the side walls for attachment to the camera of a sling or other camera carrying or supporting means. The cover unit 121 is likewise suitably cut away to accommodate the focusing shaft 86, the shutter release button 28 and its associated mechanism, and other external manipulating and indicating devices to be described later.

This cover unit may be made from any suitable material such as light metal or plastic finished in any surface and trim desired.

*Interchangeable film magazine*

As set forth above, the camera incorporates a removable film magazine quickly and easily replaceable in the compartment 51 provided therefor in the rear section 3 of the frame with another similar or modified magazine holding a different type of film. Two main embodiments of interchangeable magazines are illustrated in the drawings, the one to be described now being shown in some detail in Figures 17 to 25. This magazine comprises a case 140 having a rear wall 141, top wall 142, bottom wall 143 and end walls 144 and 145. Spaced parallel with the bottom wall 143 is a partition 146 which is joined to the rear and end walls of the case and forms therewith a gear chamber 147. The front of the case is normally closed by a cover 147' which is hinged at one end by means of a light-tight hinge 148 to the end wall 145 and makes a light-tight fit, when closed, with the top, bottom and end walls of the case and with the partition 146.

Dividing the interior of the case 140 into opposed end compartments 149 and 150 and an intermediate compartment 151 is a U-shaped partition 152 which extends between the top wall 142 and partition 146 and from the rear wall, to which it is joined, to closely adjacent the inner face of the cover 147. Dividing vertically the center compartment 151, is a vertical partition 153 which is spaced slightly inwardly from the rear wall 141 and has a light-tight connection with the end walls of the U-shaped partition 152 and with the top wall 141 and partition 146. The front wall of the U-shaped partition 152 is slightly indented to provide a film track 154 substantially the width of the film used in the magazine, and is likewise centrally cut away forming a rectangular aperture 155 in which is positioned a film pressure plate designated generally as 156.

The center compartment contains opposed pairs of film transporting sprockets 157 and 158 carried respectively on vertical shafts 159 and 160 appropriately journalled for rotation in the compartment adjacent opposite ends thereof and positioned therein, so that the teeth of the sprockets will project through apertures 161, provided therefor in the partition 152, and into the film track 154.

On the upper surface of the partition 146, substantially centrally in each of the end compartments 149 and 150 are respectively mounted yoke members 162 and 163 which carry respectively, for swinging movement outwardly in the direction of the cover 147', studs 164 and 165. Rotatably mounted respectively on the studs 164 and 165 are circular discs 166 and 167, each having a film spool driving element 168 on its upper surface. These discs 166 and 167 are adapted to support respectively a loaded or feeding film cartridge 169, and a take up or receiving cartridge 170.

The cartridges 169 and 170 are a conventional type light-tight container such as supplied by film manufacturers for daylight loading of cameras. They usually consist of a cylindrical shell having a film slot in the cylindrical wall thereof and contain a spool upon which the strip of film is wound. The hollow spindle of the spool extends both through the bottom and top of the shell, the lower end of the spindle being provided with a transverse key number or wire adapted to engage a driving slot in the film take-up mechanism of the camera—such as the slot 171 in the driving element 168. The upper end of the film spool spindle projects a sufficient distance through the upper wall of the cartridge shell to serve as means for journaling the upper end of the cartridge. In the present magazine the upper end of the spindle fits in an open end slot 172 formed in the upper wall of the magazine case in axial alignment with the center of rotation of the driving elements 168.

The driving element 168 on the disc 166 at the feed end of the magazine may be integrally formed with the disc. The element 168 on the disc 167 at the tape up end of the magazine, however, is preferably independently rotatable with respect to the disc 167 and frictionally driven thereby.

For transporting film from the feed cartridge 169 to the take-up cartridge 170 the lower end of the sprocket shaft 160 is fitted with a gear 173 which meshes with a gear 174. The gear 174 is mounted on one end of a vertical shaft 175, journalled in and extending through the partition wall 146, and carries on its lower end a miter gear 176. The gear 176 meshes with a similar miter gear 177 on one end of a horizontal shaft 178, the opposite end of which carries a clutch element 179 substantially flush with the outer surface of the end wall 145 of the magazine case. When the magazine is fully inserted in the receptacle 51 provided therefor in the camera frame, the clutch element 179 engages a cooperating clutch element 180 journalled on a stud 181 in the end wall 48 of the magazine receptacle (see Figures 5 and 6). The clutch element 180 is provided with peripheral gear teeth and is adapted to be driven, through a suitable intermediate gearing 182, by a gear 183 affixed to a shaft 184, likewise journalled in the wall 48 and extending through this wall from outside the camera into the compartment 52. The inner end of the shaft 184 carries a clutch element 185 while the outer end is squared to fit a winding key such as indicated at 186.

The key 186, or an equivalent manually operated winding device, may thus be employed to transport film for successive picture taking operations, or the film may be transported automatically by means of an appropriate spring motor 187 (not shown in detail) adapted to be positioned within the compartment 52 and controlled by operation of the camera shutter release in the usual manner. The driving shaft 188 of the motor 187 is provided with a clutch element 188' which engages clutch element 185 when the motor is in place. Either the motor 187 or the key 186 (which may serve as an emergency device in conjunction with the motor) may be employed to also wind the camera shutter mechanism (as in common practice) through the medium of appropriate gearing 189 meshed with gear 183 and connecting the motor to the shutter mechanism, as indicated generally in Figures 4 and 6.

As a novel means for winding the spring motor 187, there may be provided a toothed rack 190 affixed to the bottom wall 143 of the film magazine 140 and extending substantially the length thereof. Preferably this rack is embedded in a longitudinal groove 191 in the wall 143 so that the toothed edge lies flush with the bottom surface of the magazine. The rack 190 is adapted, when the magazine is inserted into its receptacle 51, to engage and rotate a spur gear 192 (see Figure 4) forming a part of the spring winding mechanism of the motor 187, and whose teeth extend through a slot provided therefor in the partition wall 53 separating the motor compartment from the magazine receptacle. By means of such mechanism the motor will be automatically wound each time a magazine is inserted, and moreover, assurance is provided that the motor is in condition for operation when a film magazine is in place. The motor 187 may, if desired, incorporate an indicator, such as designated generally 193 in Figure 5, which may be viewed through small registering windows 194 cut in the rear wall of the motor compartment 52 and the rear wall of the camera cover respectively.

In order to indicate visually the number of exposures which have been made on a roll of film, or the number of frames of film which have been transported, a circular disc 195 bearing graduations and indicia 196 corresponding to the number of frames on the roll of film, is journalled for rotation in the space 154 between the rear wall 141 and the partition 153 of the film magazine. Preferably the graduations 196 are arranged in two semicircles and numbered from 1 to 18 each to thereby adapt the exposure indicator to both of the conventional 18 and 36 exposure rolls of film.

The periphery of the disc 195 is provided with gear teeth 197 which mesh with a pinion 198 carried on a shaft 199 which is in turn connected through a reduction gear train 200 to a gear 201 carried on the film sprocket shaft 159. Thus, as film is transported from the feeding cartridge 169 to the take-up cartridge 170, over the sprockets 157 and 158, rotation of the sprockets 157 will effect a proportionate rotation of the disc 195. The ratio of the gearing connecting the shaft 159 with the disc 195 is, of course, calculated to rotate the disc 195 an increment equal to one graduation for each frame of film transported. The graduations and frame number indicia may be viewed through a small window 201' in the rear wall of the magazine, and, when the magazine is in the camera, through registering windows 202 in the rear wall of the magazine receptacle 51 and the camera cover. Preferably, the gear 198 has a frictional engagement with the shaft 199 to permit forced relative rotation of the disc with respect to its driving gearing for the purpose of manually resetting the disc. To accomplish this resetting, the upper edge of the disc projects above the upper rear corner of the magazine case just sufficiently to be engaged by the operator's finger.

The magazine, when removed from the camera, is a completely light-tight structure provided with an exposure aperture or window 203, the size of a single frame, located intermediate the ends of the cover 147'. This window is normally closed by a shutter or dark slide 204 slidably mounted for longitudinal movement in a slide or pocket 205 formed in the wall of the cover 147'. Adjacent one end, the dark slide is provided with a forwardly projecting lug 206 fitting, in the closed position of the slide, in a notch in one vertical edge of the window 203, and when in an open position, in a notch in the opposite vertical edge. The dark slide 204 is constantly urged to its closed position by resilient spring means, such as tension springs 207, connecting the dark slide with the cover 147'. When the magazine is inserted into the camera, the lug 206 will engage an abutment (not shown) adjacent the near edge of the aperture or window 50 in the wall 45 of the magazine receptacle and the dark slide will be forced to an open position against the tension of the spring means 207 as the magazine is pushed completely into its receptacle. When the magazine is removed from the camera a reverse action will, of course, take place. If required, the opening into the magazine receptacle, or the edge of the opening defined by the forward wall 45 may be provided with a felt or plush strip to preclude leakage of light into the magazine during insertion and removal thereof in accordance with usual practice.

It is often desirable to remove a portion of a roll of film for development prior to exposure of the entire roll. To this end, a cut-off device is provided adjacent the feed cartridge 167. This cut-off device comprises a short rod 208 slidably mounted in a vertical tube 209 extending from a recess 210 in the upper wall of the center compartment 151 to the partition 146. The tube 209 lies closely adjacent the vertical wall of the compartment, or may be formed by appropriately shaping this vertical wall, and is provided with a longitudinal slot 211 extending through the vertical wall. The upper end of the rod 208 is provided with a right angularly extending finger engaging element or handle 212, in the angle between which the rod 208 is formed, or is affixed, a knife blade 213. The cutting device normally occupies a position such as shown in Figures 17, 18, 24, that is, raised with handle 212 in the recess 210 and swung back away from the slot 211 and the blade 213 out of the film path. When it is desired to sever the film, the transport mechanism is first operated sufficiently to feed the last exposed frame completely into the light-tight cartridge 170, the cover 147' opened and the knife handle 212 swung outwardly until it registers with the slot 211 and then moved downwardly through this slot, the blade 213 cutting the film. The cartridge 170 may then be removed and replaced with an empty one and the end of film projecting from the cartridge 169 carried across the film track 154 and inserted into the new cartridge.

Mention was made above of a film emulsion speed compensating arrangement, a portion of which comprises the gear 40 driven by the endless chain 39 which carries the driving lug 43. Adapted to cooperate with this mechanism is a second portion of the film speed compensating arrangement carried by the film magazine to actuate the mechanism upon insertion of the magazine into the camera, and also to visually indicate the type and exposure meter rating of the film with which the magazine is loaded.

This second portion of the compensating arrangement comprises a super-structure or hollow block 214 secured to the top surface of the magazine case, adjacent the rear wall 141 thereof, and extending substantially the length of the case. The forward edge of the block 214 has secured thereto a channel member 215 having a longitudinal slot 216 provided with a series of regularly spaced circular enlargements 217 in its vertical web. The channel 215 constitutes a slide for a dog element 218 comprising a round shank 219 having a reduced end 220 joined to a rectangular head portion 221. The round shank 219 has a diameter substantially equal to the enlargements 217 of the slot 216 while the diameter of the reduced end is substantially equal to the width of the slot 216, and the head 221 is larger in cross section than the enlargements. Normally urging the dog in a laterally outward direction so that the shank 219 will be maintained in one of the enlargements 217 is a flat spring 222 secured to the dog and slidably engaging the edge of the block 214. From the above, it will be seen that by pushing the dog laterally inwardly with respect to the channel until the reduced portion 220 coincides with the slot, the dog may be adjusted longitudinally of the channel to any desired enlargement and when released, the spring 222 will force the dog outwardly to maintain it in the adjusted position.

The top surface of the block 214 is stamped, engraved, or finished in a surface which will accept printing ink and ruled, to provide a series of juxtaposed blocks or spaces 223 respectively adjacent each of the enlargements 217. In these spaces may be imprinted the names of the film types which may be used with the camera in the order of their emulsion speeds the "slowest" film, for example "infra red" being placed in the first space, as shown in Figure 14, and the names of progressively "faster" films in the succeeding spaces. The upper surface of the magazine adjacent the channel 215 likewise may be ruled into blocks or spaces 224 aligned with the spaces 223. In these spaces, the meter rating for the particular film may be imprinted. The head 221 of the dog 218 may have applied to the upper face thereof pointer 225, such as shown in Figure 15, which will serve to indicate at a glance the adjusted position of the dog 218 which, of course, will correspond to the type of film with which the magazine is loaded. As will be clearly seen from Figures 12 and 13, when the magazine is inserted into its receptacle 51, the dog 218 will engage the lug 43 on the chain 39 and rotate the gear 40, an amount corresponding to the adjusted position of the dog or, in other words, an amount corresponding to the relative position of the dog 218, when the magazine is fully inserted to the initial or normal position of the lug 43. The result of this action will be set forth in a later section of this description.

*Light acceptance unit*

The importance of the amount of value of light reflected from a subject being photographed, to properly expose film, is well known. The amount or value of reflected light transmitted by the camera lens from the subject onto the film, however, will, in addition to lens aperture and exposure time, vary with different lens to film distances, coated and uncoated lenses, type of lens coating, type of filter used and other factors. The usual light meter used as an instrument, apart from the camera itself, because of its universal nature, obviously cannot take into consideration the inherent characteristics of individual lenses.

This invention therefore proposes to position the light sensitive element of a light acceptance and measuring unit behind the camera lens and light filters to measure the light actually transmitted by the lens to the film plane. Preferably the light sensitive cell is incorporated as a component part of the reflex mirror unit of the camera and preferably also, made as a removable part of this unit in order that cells best suited for particular purposes may be employed.

To accomplish the above, a combined reflex mirror and light cell unit 226, such as best illustrated in Figures 8 and 9, is provided. This unit is interchangeable with the reflex mirror 112 and comprises a rectangular rigid frame 227, consisting of a base or receptacle 228 which is provided with hinge rings 229 for attaching the same for swinging movement in the light tunnel 20 of the camera. The base 228 is provided with a flanged bezel 230 adapted to be hingedly attached thereto, preferably at the point of swing of the base. Positioned in the frame 227 is a photoelectric cell 231 comprising a metal plate 232, coated with a film of light sensitive material, and permanently sealed in a transparent envelope 233 of plastic or other suitable material. The metal plate and its coating are connected respectively with terminal posts 234, and 235, fixed in the edge of the envelope, which posts are adapted to engage respectively contacts 236 and 237 secured to, but insulated from, the frame 227. The contacts 236 and 237 are connected by means of flexible conductors 238 and 239, with terminal contacts 240 and 241 (see Figure 3) adapted to lie substantially flush with the top plate 4 and by means of which connection may be made to a meter forming a part of the exposure unit 101 as will be described. The cell 231 is resiliently urged in the direction of the contacts 236 and 237 by means of a leaf spring 242 attached to the edge of the base 228 at the opposite end thereof from said contacts and bearing against the edge of the cell.

Also within the frame and covering the cell 231 is a semi-transparent plane mirror 243, made of glass, quartz or other suitable material, upon the front surface of which has been deposited by evaporation, sputtering or other suitable methods a thin metallic coating. This coating should have a thickness calculated to pass light rays through to the cell 231 and also to reflect them onto the ground glass 23. Preferably, the back surface of the mirror 243 is coated with a very thin transparent coating of a suitable material such as one of the metallic fluorides to reduce reflectance from this surface which will have the effect not only of transmitting a greater amount of light to the photo-cell but also will produce a clearer image on the ground glass 23. The free end of the bezel 230 is secured to the frame by means of a screw 244.

It will be understood that materials for both the mirror 243 and the cell 231 may vary for particular wave lengths of light being photographed and the above structure provides a simple means for interchanging these parts of the unit, the only operation necessary being to remove the ground glass 23, swing the unit to a convenient position for access to the single screw 244, removing this screw and opening the frame.

*Filter selection units*

As above stated, the filter turret or turrets 7—7A are rotated from a remote control or selection unit 110 positioned on the top plate 4 between the rails 56 and 57. Two types of unit 110 and 110A are shown respectively in Figures 34 to 36 and Figures 37 and 38 for the actuation respectively of a single or a double filter turret. Both the single selector unit 110 and the double unit 110A are interchangeable one with the other and are essentially similar, comprising a rectangular casing 245 having longitudinal grooves 246, in opposite sides and adjacent the hollow wall, for engaging the flanges of the rails 56 and 57.

The single unit 110 has journaled therein a horizontal shaft 247 which extends through the front wall 248 of the case and is provided on its extended end with a knob 249 having formed thereon a pointer 250. The face of the front wall 248 is laid out with indicators 251 in a concentric arrangement, and in suitable design, about the shaft 247, and which designate, by appropriate colors or name designations, the types of filters in the turret 7. The inner end of the shaft 247 is connected through a speed increasing gear train, designated generally as 252, with a shaft 253 which carries the pinion 109 adapted to mesh with and rotate the filter turret disc 7. The ratio of the above gearing is, of course, calculated to give a 1 to 1 ratio between the knob 249 and the turret disc 7 so that a visual indication will be given by the pointer 250 registering with one of the indicators 251 which filter is in position behind the lens.

The double selector unit 110A shown in Figures 37 and 38 is essentially the same as above except that double, concentric shafts 247, 247A provided, respectively, having knobs 249 and 249A. The shafts 247 and 247A are each connected by separate but identical gear trains 252 and 252A respectively with a pair of pinions 109 and 109A mounted on concentric shafts 253 and 253A and adapted to mesh respectively with the peripheral teeth on the filter turrets 7 and 7A. The front face of the casing 245A is laid out with a double concentric series of indicators 251 and 251A.

*Exposure control units*

One of the principal features of this invention is the incorporation with the camera of centralized and conveniently located interchangeable exposure control units having the necessary manipulative equipment for the computation and control of photographic factors entering into the picture taking equations. Moreover, such interchangeable exposure control units provide a camera design of such flexibility as to adequately meet the financial and technical requirements of the professional photographer, advanced amateur and beginner.

One of such exposure control units 101, which may for distinction be termed a "master control unit" is illustrated in Figures 26 and 27 of the drawings. This unit comprises a substantially enclosed case 255, generally rectangular in shape, and provided with longitudinal grooves 256, in opposed side walls adjacent the bottom edges thereof, for engaging the flanges of the rails 58 and 59 to secure the unit to the camera frame.

Rotatably journalled in the case 255 are a pair of concentric horizontal shafts 257 and 258, both extending through the front wall 259 of the case and respectively provided with knobs 260 and 261. The inner end of the shaft 257 terminates within the case and is provided with a bevel gear segment 262 which is adapted to mesh, when the control unit is in place on the camera, with a bevel pinion 263 carried on the upper end of a vertical shaft 264 operatively connected with the shutter mechanism of the camera for setting the speed thereof. The operation of such shutter speed setting devices is believed well understood and the connection of the shaft 264 is not illustrated. The knob 261, on the outer end of the shaft 257 is provided with a pointer 265 adapted to move, upon rotation of the knob, over a semi-circular fixed scale 266 arranged concentrically with the shaft 257 and bearing indicia representing the shutter speeds. Thus, by rotating the knob 261 to where its pointer registers with a desired shutter speed on the scale 266, a corresponding movement is transmitted to the shaft 264 to set the shutter to operate at such speed.

The shaft 258 extends through the rear wall of the unit case and is provided on its projecting end with a clutch element 267 adapted to engage the clutch element 100 to impart rotation of the knob 260 to the diaphragm setting pinion 98. It will be noted that the hollow shaft 257 is composed of two axially spaced sections connected by a yoke or bridging piece 267. Affixed to the portion of the shaft 258 lying within the space between the sections of shaft 257 is a pointer 268 bent inwardly so that its free end will move over a semi-circular scale 269 concentric with and adjacent the scale 266. The scale 269 is laid off in increments bearing lens f numbers, rotation of the knob 260 to a desired f number on the scale 269 will accordingly adjust the diaphragm through the linkage and gearing above described connecting the pinion 98 with the diaphragm setting ring gear 88 of the lens in operative position in the camera.

Positioned within an inner compartment 270 in the case 255 is a meter unit, indicated generally as 271, of the conventional moving coil microammeter type electrically connected through an appropriate circuit (not shown) with a pair of terminals 272 and 273 which are adapted, when the control unit is in place, to make electrical contact with the terminals 240 and 241 to place the meter in circuit with the photo cell 232 to be activated thereby. The needle 274 of the meter is positioned to move across an arcuate fixed scale 275 marked with numbers designating light unit values as in usual practice.

Between the knob 261 and the face of the front wall 259, and rotatable about the axis of the shaft 257 is a dial 276. The upper half of this dial is provided with a forwardly projecting finger engaging pointer element 277 pointing to the scale 275, and with an arcuate aperture 278. The lower half of the dial 276 is divided and numbered with lens f numbers corresponding to the f number designations on the scale 269.

Immediately behind the front wall 259 of the case 255 and journalled for rotation about the axis of the shaft 257 is a cupped and peripherally flanged circular dial 279, the face of the flange of which is laid out with two concentric rows of indicia, the inner row representing film emulsion speed numbers and the outer row representing shutter speeds corresponding to the shutter speed designations on the scale 266. The film emulsion speed numbers are arranged to be viewed through a small aperture 280 in the front wall 259 of the case 255. The shutter speed designations on the dial 279 are arranged to lie adjacent and align radially with the f number designations on the dial 276. The dial 279 is provided with gear teeth meshing with a pinion 281, on one end of a short horizontal shaft 282 journalled in the case. The opposite end of the shaft 282 carries a miter gear 283 adapted to mesh with and be driven by the miter gear 40 forming a part of the emulsion speed setting device above referred to.

From the above, it will be seen that when a film magazine is inserted in the camera with the dog 218 adjusted for the speed of film in the magazine, the dial 279 will be accordingly rotated, through medium of the gears 40, 283 and 281, a corresponding film speed rating number will be shown through aperture 280, and the shutter speed designations on the dial 279 will be moved relative to the f number designations on the dial. As a subject is now viewed through the camera, lens its reflected light falling on the photocell 232 is registered by the needle 274 of light meter 271 on the light value scale 275. The photographer then moves the dial 276 by means of the projecting pointer 277, until the pointer 277 which moves the f number scale of the dial 276 relative to the shutter speed scale of the dial 279, registers with the needle 274. These two adjacent scales will then indicate a number of shutter speed-lens aperture ratios from which the photographer may select his shutter speed and diaphragm opening according to his desires for speed or depth of field in the manner of employing the conventional light meter. These settings are made, as above stated, by manipulation of the knobs 261 and 260 to bring their respective pointers in registration with the desired shutter speed and f number designations on the scales 266 and 269.

Figure 10:
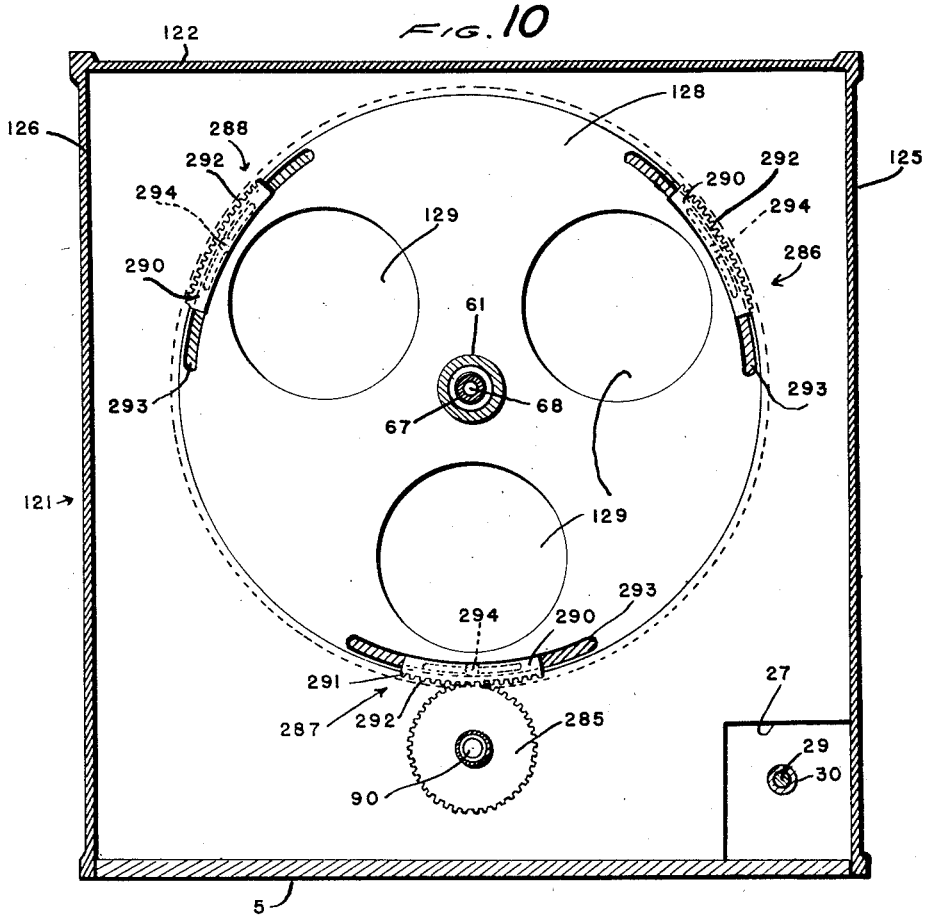
Figure 10 is a sectional view taken along the line 10—10 of Figure 4 showing the arrangement of the lens ring and its associated parts, the lenses being omitted.

It is highly desirable when focusing and forming a subject on a ground glass screen to perform the operation through the lens at its maximum aperture. Transmission of light through the lens at maximum aperture likewise provides for a more accurate measurement of the light transmitted. In order to automatically assure that each lens, when moved in the turret into picture taking position, is at its maximum-rated aperture, and also to visually indicate to the photographer, when normally holding the camera for viewing, which lens is in picture taking position by such rating, the following mechanism is provided:

Secured to the shaft 90, spaced forwardly from the nest of gears 89, is a gear 285. Adapted to mesh with the gear 285, when the lens turret is moved forwardly for rotation, are a plurality of arcuate rack members or gear segments 286, 287 and 288 carried by the circular plate 128, for adjustment about the axis thereof, respectively adjacent the lenses 12, 13 and 14. As best seen in Figures 4 and 10 the racks 286, 287 and 288 each comprise an arcuate web portion 290 having an external flange 291 provided with peripheral gear teeth 292. Convenient means are provided for adjustably securing the rack members to the inner face of the plate 128 such as arcuate grooves 293 concentric with the plate and adjacent the periphery thereof, one opposite each of the lens openings 196, and in which the web 290 of the respective rack members are adapted to slide. Suitable clamping means, such as a clamp screw 294 passing through an arcuate slot 295 in the plate 128 and engaging the web, may be provided for clamping the rack member in adjusted position. It will be noted by reference to Figure 4 that the width of the web 290 is such that the toothed flange 291 just disengages or clears the gear 285 when the lens turret is in its normal or rearward position, and when the turret is pulled forwardly for rotating the same, the teeth 293 will engage those of the gear 285 before the gear 88 disengages its mating gear in the nest 89.

The rack members 286, 287 and 288 are preferably adjusted with respect to their lenses so that at maximum diaphragm opening of the lens, the last tooth of the rack will ride out of engagement with the aperture setting gear 88 upon initial rotation of the turret. It may be pointed out that the overriding clutch 63 is arranged to permit rotation of the turret only in a direction where the rack, engaging the gear 88, will increase the diaphragm opening or aperture of the lens. The operation of this mechanism will then be as follows:

Consider the normal lens 12 which, for example, has a maximum aperture of f 1.9, is being used at an aperture of f 8 and the next exposure is to be made with the telephoto lens 13 which, for example, has a maximum aperture of f 5.6. The f 8 aperture of the lens 12 will be indicated by the pointer 268 on the scale 269 of the exposure control unit 101. As the lens turret is pulled out, the aperture setting ring gear 88 moves out of engagement with its mating gear in the nest 89 and the rack 286 simultaneously engages the gear 285. As the gear 88 disengages, the diaphragm of the lens 12 automatically moves to its f 1.9 position through action of the return spring arrangement 80.

As the turret is rotated, the rack 286 will rotate the gear 285 and through the connecting linkage to the shaft 258, to move the pointer 268 to the maximum aperture or f 1.9 end of the scale 269. As soon, however, as the rack 286 rides out of engagement with the gear 285, by continued rotation of the turret, the spring means 102 will effect a reverse rotation of the shaft 258 to move the pointer 268 to the minimum aperture or f 32 end of the scale. As the lens 13 now moves into position, its rack 287 will engage the gear 285 to move the pointer 268 again toward the f 1.9 end of the scale. Since this rack, however, is adjusted as above set forth, when the lens 13 is in position so that the lip 71 on the turret 11 will drop into its aperture 73 in the support plate 10 to return the turret to its normal position, the pointer 268 will have moved only to the f 5.6 designation on the scale 269. As the turret returns rearwardly to its normal position under action of the spring 69, the rack 287 disengages the gear 285 but simultaneously the gear 88 on the lens 13 engages its mating gear in the nest 89 and holds the pointer in this position. Thus the newly positioned lens is at maximum diaphragm opening for framing and focusing the subject and, in addition, the aperture scale 269 indicates at a glance, since the photographer usually identifies his lenses by their rated maximum apertures, which lens is in picture taking position.

A simpler form of exposure control unit 101A is illustrated in Figures 28 to 30. This unit may be termed an "advanced control unit" and meets the requirements of users who do not desire as elaborate and complete control as that described above. The casing 255A of the unit 101A is identical in size and shape as the casing 255 and is interchangeable on the camera frame with the latter. In general, the unit 101A does not incorporate the light meter and associated computation scales, and aperture setting mechanism included in the unit 101. The simpler unit, rather, is provided with a single shaft 257A and gear segment 262A, which meshes with the shutter speed setting gear 263. The outer end of the shaft 257A carries a knob 259A provided with a pointer 265A which moves over a fixed arcuate scale 266A bearing designations representing shutter speeds. The dial 279 is actuated in the manner set forth above and the film speed rating numbers are viewed, in the same manner, through a small window 280A in the front wall of the case.

The unit 101A is adapted to be used with the camera equipped with conventional lenses, that is, lenses in mounts having finger engaging diaphragm setting rings and focusing rings or in lenses mounted in barrels or mounts equipped with the tube 78 but from which the gear 88 may be omitted. In the latter case, the tube 78 may be provided with an engraved line at the point where the tube passes through the plate 128 and arcuate scales having f number designations suitable to the particular lenses secured to the plate 128 concentric with the lens openings therein. With the use of such lenses, obviously certain parts which cooperate with the control unit 101, such as the combined reflex mirror and photo cell, and the diaphragm setting mechanism (elements 88 to 100 and 285 to 294) may be omitted thereby substantially reducing the cost of the camera. It is to be understood, however, that the camera is so designed and constructed that the specified elements may be incorporated with or omitted from the base unit or frame without change to the frame itself. Moreover, the basic camera frame is primarily machined to accept these elements when and as desired by the owner.

A still simpler form of exposure control unit 101B, which may be termed a "primary control unit," is shown in Figures 31 to 33. This unit is essentially the same as the unit 101A and is interchangeable therewith, except that the unit 101B does not include the film speed indicating dial 279. It includes only the shutter speed setting knob 259B with its associated scale 266B, shaft 257B, and gear segment 262B which is adapted to mesh with the shutter speed setting gear 263.

With the camera equipped with the control unit 101B, the normal demands of the beginning amateur may be met at a comparatively small cost. In addition to the elements which were omitted from the camera mechanism when used with the control unit 101A, the film speed setting organization comprising the elements 25 to 40 on the camera frame and elements 214 to 221 on the film magazine may also be omitted. These organizations may likewise be added to the camera and magazine without change in the basic units, at the desire of the owner.

I claim:

1. In a photographic camera a frame or chassis comprising a front section having a base and a wall perpendicular thereto, said wall having an aperture, a rear section supported on said base in spaced relation to said wall, said rear section having a wall parallel to the first named wall and having an aperture coaxially aligned with the first named aperture, an intermediate section supported on said base between said walls, said intermediate section including a tunnel connecting said apertures, means carried by the first named wall for supporting photographic lens with the optical axis thereof coinciding with the common axis of said apertures, and means carried by the rear section for supporting a photographic film in registration with the second named aperture.

2. In a photographic camera, a frame or chassis comprising a front section having a base and a wall perpendicular thereto, said wall having an aperture, a rear section supported on said base in spaced relation to said wall, said rear section having a wall parallel to the first named wall and having an aperture coaxially aligned with the first named aperture, an intermediate section supported on said base between said walls, said intermediate section including a tunnel connecting said apertures, means carried by the first named wall for supporting photographic lens with the optical axis thereof coinciding with the common axis of said apertures, means carried by the rear section for supporting a photographic film in registration with the second named aperture, and means associated with the intermediate section for carrying a shutter for movement transversely across said tunnel substantially in the focal plane of said lens.

3. In a photographic camera a frame or chassis comprising a front section having a base and a wall perpendicular thereto, said wall having an aperture, a rear section supported on said base in spaced relation to said wall, said rear section having a wall parallel to the first named wall and having an aperture coaxially aligned with the first named aperture, an intermediate section supported on said base between said walls, said intermediate section including a tunnel connecting said apertures, a lens support detachably carried by the first named wall, a photographic lens including a mount carried by the support with the optical axis of the lens coinciding with the common axis of said apertures, and means carried by the rear section for supporting a photographic film in registration with the second named aperture.

4. In a photographic camera a frame or chassis comprising a front section having a base and a wall perpendicular thereto, the said wall having a recess therein adapted for the reception of light filtering means, said wall also having an aperture therethrough lying within said recess, a rear section supported on said base in spaced relation to said wall, said rear section having a wall parallel to the first named wall and having an aperture coaxially aligned with the first named aperture, an intermediate section supported on said base between said walls, said intermediate section including a tunnel connecting said apertures, means carried by the first named wall for supporting a photographic lens with the optical axis thereof coinciding with the common axis of said apertures, and means carried by the rear section for supporting a photographic film in registration with the second named aperture.

5. In a photographic camera a frame or chassis comprising a front section having a base and a wall perpendicular thereto, said wall having an aperture, a rear section supported on said base in spaced relation to said wall, said rear section having a wall parallel to the first named wall and having an aperture coaxially aligned with the first named aperture, an intermediate section supported on said base between said walls, said intermediate section including a tunnel connecting said apertures, means carried by the first named wall for supporting a photographic lens with the optical axis thereof coinciding with the common axis of said apertures, means carried by the rear section for supporting a photographic film in registration with the second named aperture, said tunnel having an opening at right angles to the axis of said apertures, and means in the tunnel adapted for attaching therein a swingable reflex mirror for reflecting an image projected by the lens into said opening.

6. In a photographic camera a frame or chassis comprising a front section having a base and a wall perpendicular thereto, said wall having an aperture, a rear section supported on said base in spaced relation to said wall, said rear section having a wall parallel to the first named wall and having an aperture coaxially aligned with the first named aperture, an intermediate section supported on said base between said walls, said intermediate section including a tunnel connecting said apertures, means carried by the first named wall for supporting photographic lens with the optical axis thereof coinciding with the common axis of said apertures, said rear section forming a transverse receptacle having an opening at one end thereof and also having said last named aperture therein, a film carrying magazine adaptable for insertion in said receptacle, said magazine having an opening adapted to register with said last named aperture when the magazine is inserted in said aperture, sliding door means normally closing the opening when the magazine is withdrawn from the receptacle, and means carried by said rear section and engageable with the door means to slide the same to uncover the opening when the magazine is moved into the receptacle.

7. In a photographic camera a frame or chassis comprising a front section having a base and a wall perpendicular thereto, said wall having an aperture, a rear section supported on said base in spaced relation to said wall, said rear section having a wall parallel to the first named wall and having an aperture coaxially aligned with the first named aperture, an intermediate section supported on said base between said walls, said intermediate section including a tunnel connecting said apertures, means carried by the first named wall for supporting photographic lens with the optical axis thereof coinciding with the common axis of said apertures, said rear section forming a transverse receptacle having an opening at one end thereof and also having said last named aperture therein, a film carrying magazine adaptable for insertion in said receptacle, said magazine having an opening adapted to register with said last named aperture when the magazine is inserted in said aperture, sliding door means normally closing the opening when the magazine is withdrawn from the receptacle, means carried by said rear section and engageable with the door means to slide the same to uncover the opening when the magazine is moved into the receptacle, a cover member enclosing the sections and having an open side adapted for securement to said base adjacent the edges defining said open side, and door means in the cover for closing the open end of said receptacle.

8. In a photographic camera a frame or chassis comprising a front section having a base and a wall perpendicular thereto, said wall having an aperture, a rear section supported on said base in spaced relation to said wall, said rear section having a wall parallel to the first named wall and having an aperture coaxially aligned with the first named aperture, an intermediate section supported on said base between said walls, said intermediate section including a tunnel connecting said apertures, means carried by the first named wall for supporting a photographic lens with the optical axis thereof coinciding with the common axis of said apertures, means carried by the rear section for supporting a photographic film in registration with the second named aperture, and a cover enclosing said sections, said cover having an open side closed by the base, means attachably securing the cover to the base, said cover having an opening adjacent said lens and a second opening for access to said rear section.

9. In a photographic camera, a frame or chassis comprising a front section having a base and a wall perpendicular thereto, said wall having an aperture, a rear section supported on said base in spaced relation to said wall, said rear section having a wall parallel to the first named wall and having an aperture coaxially aligned with the first named aperture, said walls defining an intermediate compartment, means carried by the first named wall for supporting a photographic lens with the optical axis thereof coinciding with the common axis of said apertures, means carried by the rear section for supporting a photographic film in registration with the second named aperture, means in said compartment for carrying a shutter and mechanism to move the same transversely with respect to the last named aperture substantially in the focal plane in the lens, and a cover enclosing said sections and compartment, said cover having an open side closed by said base and also having an opening adjacent the lens and an opening for access to said rear section, and means for attachably securing the cover to the base.

HERBERT D. KIRBY.

REFERENCES CITED

The following references are of record in the file of this patent:

UNITED STATES PATENTS

| Number | Name | Date |
|---|---|---|
| 561,132 | Roche | June 2, 1896 |
| 738,066 | Reichenbach | Sept. 1, 1903 |
| 760,584 | Thornton | May 24, 1904 |
| 1,036,385 | Vale | Aug. 20, 1912 |
| 1,613,363 | Tessier | Jan. 4, 1927 |
| 1,980,546 | Petit et al. | Nov. 13, 1934 |
| 2,000,090 | Mitchell | May 7, 1935 |
| 2,005,014 | Tondreau | June 18, 1935 |
| 2,135,993 | Wengel | Nov. 8, 1938 |
| 2,143,769 | Fairbanks | Jan. 10, 1939 |
| 2,172,337 | Mihalyi | Sept. 5, 1939 |
| 2,194,031 | Riszdorfer | Mar. 19, 1940 |
| 2,252,640 | Nuchterlein | Aug. 12, 1941 |
| 2,256,517 | Cohen | Sept. 23, 1941 |
| 2,280,561 | Wappler | Apr. 21, 1942 |
| 2,282,075 | Mihalyi | May 5, 1942 |
| 2,289,740 | Stuber et al. | July 14, 1942 |
| 2,297,428 | Nuchterlein | Sept. 29, 1942 |
| 2,302,597 | Bing | Nov. 17, 1942 |
| 2,319,304 | Dalotel | May 18, 1943 |
| 2,320,722 | Frost | June 1, 1943 |
| 2,348,510 | Aiken | May 9, 1944 |
| 2,369,199 | Aiken | Feb. 13, 1945 |
| 2,378,406 | Harris | June 19, 1945 |
| 2,381,033 | Bolsey | Aug. 7, 1945 |
| 2,386,538 | Bolsey | Oct. 9, 1945 |
| 2,397,915 | Bolsey | Apr. 9, 1946 |